United States Patent
Sasaki

(10) Patent No.: US 9,902,274 B2
(45) Date of Patent: Feb. 27, 2018

(54) VEHICLE ELECTRIC POWER SYSTEM

(71) Applicant: TOYOTA JIDOSHA KABUSHIKI KAISHA, Toyota-shi, Aichi-ken (JP)

(72) Inventor: Kazuyuki Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 14/881,669

(22) Filed: Oct. 13, 2015

(65) Prior Publication Data

US 2016/0152147 A1    Jun. 2, 2016

(30) Foreign Application Priority Data

Nov. 28, 2014 (JP) .................................. 2014-242152

(51) Int. Cl.
*B60L 11/18* (2006.01)
*B60L 1/00* (2006.01)
*H02M 3/335* (2006.01)

(52) U.S. Cl.
CPC ................. *B60L 11/18* (2013.01); *B60L 1/00* (2013.01); *B60L 11/1864* (2013.01); *H02M 3/33507* (2013.01); *B60L 2250/20* (2013.01); *Y02T 10/7005* (2013.01); *Y02T 10/7061* (2013.01)

(58) Field of Classification Search
CPC ................................ B60L 11/18; B60L 11/005
See application file for complete search history.

(56) References Cited

U.S. PATENT DOCUMENTS

| 6,384,489 B1* | 5/2002 | Bluemel | H02J 1/08 307/10.1 |
| 2005/0093374 A1* | 5/2005 | Connors | G06K 19/0705 307/126 |
| 2010/0332063 A1* | 12/2010 | Saeki | B60L 3/00 701/22 |

FOREIGN PATENT DOCUMENTS

| EP | 1035640 A1 | 9/2000 |
| JP | 2006-254565 A | 9/2006 |
| JP | 2007-300693 A | 11/2007 |
| JP | 2008-005622 A | 1/2008 |
| JP | 2009-019780 A | 1/2009 |
| JP | 2011-087408 A | 4/2011 |
| JP | 2012-115056 A | 6/2012 |
| JP | 2012-244875 A | 12/2012 |
| JP | 2014-058817 A | 4/2014 |

* cited by examiner

*Primary Examiner* — Daniel Kessie
*Assistant Examiner* — Terrence Willoughby
(74) *Attorney, Agent, or Firm* — Oliff PLC

(57) ABSTRACT

There is provided a vehicle electric power system comprising: a battery; a first DC-DC converter configured to step down a voltage of electric power; a second DC-DC converter configured to step down the voltage of the electric power; an electric power storage unit configured to accumulate energy of the electric power whose voltage is stepped down to a first voltage by the second DC-DC converter; an electric power receiving unit configured to receive an electric power from an external device, a voltage of the received electric power being less than the first voltage; and a control circuit configured to control the first DC-DC converter and the second DC-DC converter; wherein the control circuit is started with the electric power received by the electric power receiving unit and operated with electric power, whose voltage is a second voltage less than the first voltage.

14 Claims, 7 Drawing Sheets

VEHICLE ELECTRIC POWER SYSTEM

BACKGROUND OF THE INVENTION

1. Field of the Invention

The present disclosure relates to a vehicle electric power system.

2. Description of the Related Art

In a vehicle electric power system, a DC-DC converter is known, which provides electric power to a load by stepping down a voltage of electric power supplied by the main battery so that an auxiliary battery for supplying the electric power to the load is not required (for example, see Patent Document 1). The vehicle electric power system includes a control circuit for controlling the DC-DC converter and a starting device for starting the control circuit.

However, the aforementioned conventional art is likely to be high cost, since the control circuit and the starting device are fed by the main battery whose voltage is relatively high, and they have to be formed as high withstand voltage parts.

RELATED ART DOCUMENT

Patent Document

[Patent Document 1] Japanese Laid-open Patent Publication No. 2006-254565

SUMMARY OF THE INVENTION

An object of the present disclosure is to provide a vehicle electric power system in which a high withstand voltage control circuit for controlling the DC-DC converter and a high withstand voltage starting device for starting the control circuit are not required.

The following configuration is adopted to achieve the aforementioned object.

In one aspect of the embodiment, there is provided a vehicle electric power system comprising: a battery; a first DC-DC converter configured to step down a voltage of electric power supplied from the battery to supply a load with the converted electric power whose voltage is stepped down; a second DC-DC converter configured to step down the voltage of the electric power supplied from the battery; an electric power storage unit configured to accumulate energy of the electric power whose voltage is stepped down to a first voltage by the second DC-DC converter; an electric power receiving unit configured to receive electric power from an external device, a voltage of the received electric power being less than the first voltage; and a control circuit configured to control the first DC-DC converter and the second DC-DC converter; wherein the control circuit is started with the electric power received by the electric power receiving unit and then controls the second DC-DC converter to step down the voltage of the electric power to the second voltage which is less than the first voltage such that the control circuit is operated with electric power from the second DC-DC converter.

Other objects, features and advantages of the present invention will become more apparent from the following detailed description when read in conjunction with the accompanying drawings.

DETAILED DESCRIPTION OF THE PREFERRED EMBODIMENTS

In the following, embodiments are described in detail with reference to appended drawings.

<Configuration of Electric Power System 101>

Figure 1:
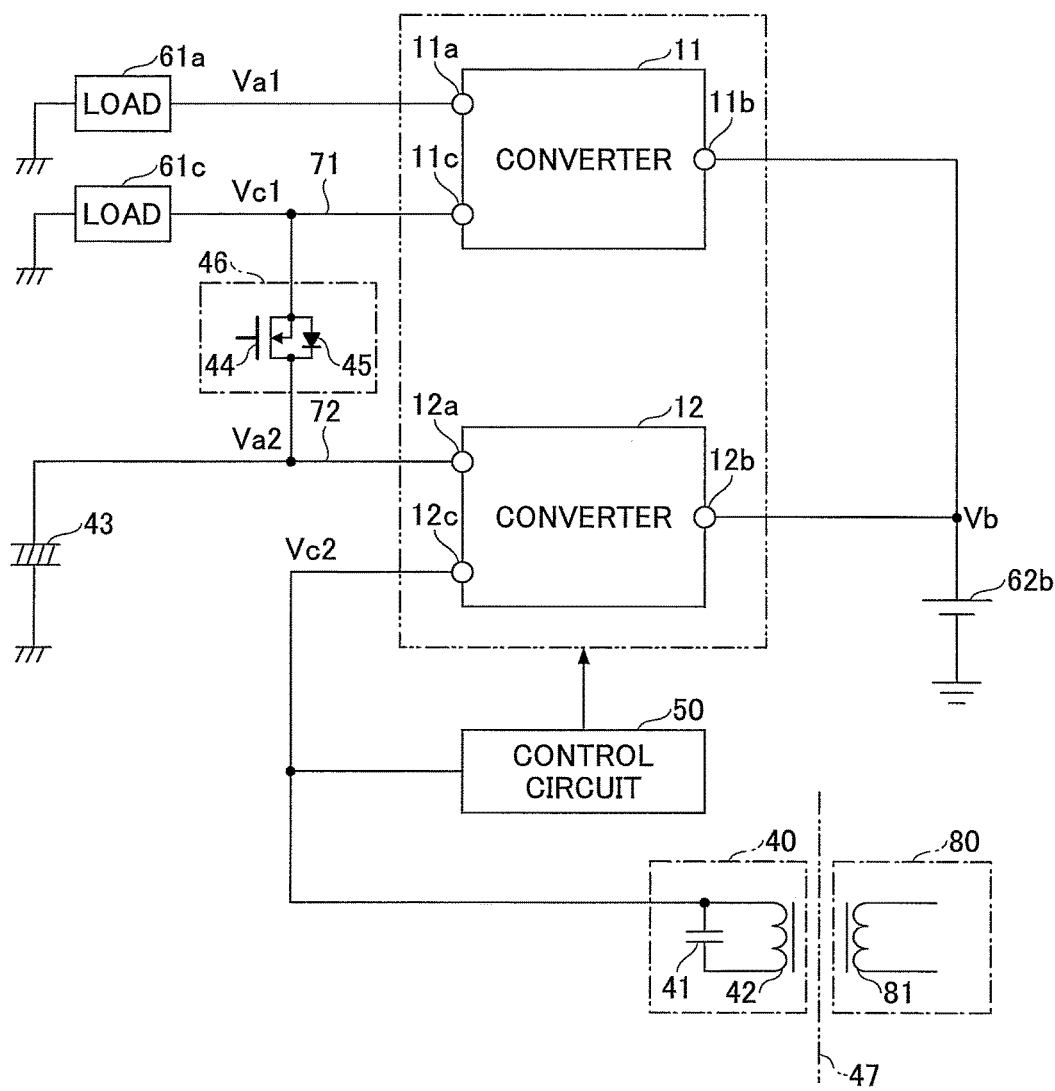
FIG. 1 is an example configuration of an electric power system for a vehicle.

FIG. 1 is an example configuration of an electric power system 101 for a vehicle. For example, the electric power system 101 is an example of a vehicle electric power system installed in a vehicle such as an automobile, supplying electric power to respective loads installed in the vehicle. The electric power system 101 includes a battery 62*b*, a first converter 11, a second converter 12, an electric power storage unit 43, an electric power receiving unit 40 and a control circuit 50.

The battery 62*b* is connected to a port lib of the first converter 11 and a port 12*b* of the second converter 12. The battery 62*b* may be referred to as a propulsion battery or a traction battery of a high voltage system (for example, such as a 288 V system or a 200 V system). A secondary battery such as a lithium ion battery is exemplified as the battery 62*b*.

The first converter 11 is an example of a first DC-DC converter which converts a DC electric power supplied from the battery 62*b* to a port 11*b* by stepping-down its voltage to provide the converted DC electric power to the load 61*c*. The first converter 11 converts the DC electric power provided to the port 11*b* by stepping-down its port voltage Vb (for example, 288 V) to a port voltage Vc1 (for example, 12 V) which is less than the port voltage Vb. Then, the first converter 11 outputs the converted DC electric power whose port voltage has been stepped-down to Vc1 to the load 61*c* through a port 11*c*.

The load 61*c* is formed of one or more loads connected to the port 11*c* of the first converter 11. The load 61*c* may be referred to as an auxiliary load of a low voltage system (for example, 12 V system). An ECU (Electronic Control Unit) for controlling a device, etc., is exemplified as the load 61*c*.

The second converter 12 is an example of a second DC-DC converter which converts DC electric power supplied from the battery 62*b* to a port 12*b* by stepping-down its voltage. The second converter 12 converts the DC electric power provided to the port 12*b* by stepping-down its port voltage Vb (for example, 288 V) to a port voltage Va2 (for example, 12 V) which is less than the port voltage Vb. Then, the second converter 12 outputs the converted DC electric power whose port voltage has been stepped-down to Va2 to the electric power storage unit 43 through a port 12*a*.

The electric power storage unit 43 connected to the port 12*a* of the second converter 12 stores energy of the converted DC electric power whose port voltage has been stepped-down to Va2 by the second converter 12. For example, the electric power storage unit 43 is a capacitor whose capacitance is less than that of the battery 62b. A lithium ion capacitor is exemplified as the electric power storage unit 43.

The electric power receiving unit 40 receives electric power whose voltage is less than the port voltage Va2 from an external device 80. For example, the electric power receiving unit 40 is disposed on a door 47 of the vehicle. For example, the electric power receiving unit 40 includes an electric power receiving coil 42 for receiving the electric power without contacting the external device 80, and a capacitor 41 connected in parallel with the electric power receiving coil 42. The capacitor 41 temporarily accumulates energy of the DC electric power received by the electric power receiving coil 42 which is energized by the transmitted electric power from the external device 80. For example, the capacitance of the capacitor 41 is less than the capacitance of the electric power storage unit 43. The capacitor 41 may be a lithium ion capacitor or a capacitor other than the lithium ion capacitor.

The external device 80 is a device capable of transmitting the electric power whose voltage is less than the port voltage Va2 to the electric power receiving unit 40, and is a portable electronic device. For example, the external device 80 includes an electric power transmitting coil 81 for transmitting the electric power to the electric power receiving coil 42 of the electric power receiving unit 40 without contacting it. A wireless communication terminal device such as a wireless key, a smartphone, etc., is exemplified as the external device 80.

The manner in which the electric power receiving unit 40 receives the electric power is not limited to the wireless transmission such as NFC (Near Field Communication), RFID (Radio Frequency Identifier), etc., but the electric power receiving unit 40 may receive the electric power from the external device 80 through a wired transmission. For example, the electric power receiving unit 40 may receive the electric power through the USB (Universal Serial Bus).

The control circuit 50 is a control unit for controlling voltage conversion operations of the first converter 11 and the second converter 12. For example, the control circuit 50 generates a first control signal for having the first converter 11 perform the voltage conversion operation, and outputs the first control signal to the first converter 11. Similarly, for example, the control circuit 50 generates a second control signal for having the second converter 12 perform the voltage conversion operation, and outputs the second control signal to the second converter 12. For example, the control circuit 50 is a microcomputer including a CPU or a circuit including the microcomputer.

The control circuit 50 is started with the electric power received by the electric power receiving unit 40. Thus, the control circuit 50 is started with electric power whose voltage (for example, 5 V) is less than the port voltage Vb and Va2, therefore a high withstand voltage starting device (for example, a starting device fed by the battery 62b) for starting the control circuit 50 is not required. When the high withstand voltage starting device is not required, the cost of the electric power system 101 can be reduced.

After starting with the electric power received by the electric power receiving unit 40, the control circuit 50 can start the control of the voltage conversion operations of the first converter 11 and the second converter 12, and for example, it can start to generate the first control signal and the second control signal.

After starting with the electric power received by the electric power receiving unit 40, the control circuit 50 is operated with the DC electric power whose voltage is stepped-down to the port voltage Vc2 (for example 5 V) which is less than the port voltage Va2 by controlling the second converter 12. That is, after starting with the electric power provided from the electric power receiving unit 40, the control circuit 50 controls the second converter 12 to output the electric power from the port 12c, whose voltage is the port voltage Vc2, thereby acquiring the output electric power to operate the control circuit 50 itself. Since the control circuit 50 is operated with the electric power whose voltage is stepped-down to the port voltage Vc2 which is less than the port voltage Vb and Va2, the control circuit 50 is not required to be formed as a high voltage withstanding part.

For example, the control circuit 50 having started with the electric power from the electric power receiving unit 40 performs the control of the second converter 12 to supply the electric power to the control circuit 50 itself in priority to the control of the first converter 11 to supply the electric power to the load 61c. Thus, the lack of the electric power necessary for operating the control circuit 50 is prevented even if the amount of the electric power provided from the electric power receiving unit 40 to the control circuit 50 is relatively small.

For example, the control circuit 50 starts to supply the electric power to the load 61c by starting the first converter 11 according to the first control signal after a certain time passes from starting to supply the electric power to the control circuit 50 by starting the second converter 12 according to the second control signal. Thus, the control circuit 50 can supply the electric power to the control circuit 50 itself in priority to the load 61c, thereby preventing the lack of the electric power necessary for operating the control circuit 50 after starting the control circuit 50.

For example, the control circuit 50 may control the first converter 11 and the second converter 12 so that the electric power supplied from the battery 62b to the second converter 12 is greater than that supplied to the first converter 11. Thus, also the control circuit 50 can supply the electric power to the control circuit 50 itself in priority to the load 61c, thereby preventing the lack of the electric power necessary for operating the control circuit 50 after starting the control circuit 50.

For example, the control circuit 50 having been started with the electric power from the electric power receiving unit 40 may control the second converter 12 so as to supply the electric power to the control circuit 50 itself in priority to the electric power storage unit 43. Thus, even if the amount of electric power supplied from the electric power receiving unit 40 to the control circuit 50 is relatively small, the lack of the electric power necessary for operating the control circuit 50 after starting it is prevented.

For example, the control circuit 50 starts to supply the electric power to the electric power storage unit 43 by starting the second converter 12 after a certain time passes from starting to supply the electric power to the control circuit 50 by starting the second converter 12 according to the second control signal. Thus, the control circuit 50 can supply the electric power to the control circuit 50 itself in priority to the electric power storage unit 43, thereby preventing the lack of the electric power necessary for operating the control circuit 50 after starting the control circuit 50.

For example, the control circuit 50 may control the second converter 12 so that the electric power supplied from the second converter 12 to the control circuit 50 itself is greater than that supplied to the electric power storage unit 43. Thus, also the control circuit 50 can supply the electric power to the control circuit 50 itself in priority to the electric power storage unit 43, thereby preventing the lack of the electric power necessary for operating the control circuit 50 after starting the control circuit 50.

For example, the electric power system 101 includes a first feeding path 71, a second feeding path 72 and a switching circuit 46.

The first feeding path 71 is a current flow path connecting a port 11c of the first converter 11 and the load 61c. The second feeding path 72 is a current flow path connecting a port 12a of the second converter 12 and the electric power storage unit 43. The switching circuit 46 switches conductivity (conductive or non-conductive) between the first feeding path 71 and the second feeding path 72. For example, the electric power can be supplied from the second converter 12 or the electric power storage unit 43 to the load 61c, when the control circuit 50 controls the switching circuit 46 to have a conduction state between the first feeding path 71 and the second feeding path 72 be conductive.

In this case, the port voltage Vc1 stepped down by the first converter 11 and the port voltage Va2 stepped down by the second converter 12 are the same voltage. Additionally, in a case where the port voltage Vc1 is different from the port voltage Va2, for example, a DC-DC converter may be connected in series with the switching circuit 46 and disposed between the first feeding path 71 and the second feeding path 72.

The switching circuit 46 switches the conduction state between the first feeding path 71 and the second feeding path 72 to be conductive in a case where the electric power supplied from the first converter 11 to the load 61c is insufficient. Thus, the electric power is supplied from the second feeding path 72 to the first feeding path 71, thereby complementing the insufficiency of the electric power supplied from the first converter 11 to the load 61c.

For example, the switching circuit 46 includes a switch 44 and a diode 45. The switch 44 is an example of a switch for turning on/off the conductivity between the first feeding path 71 and the second feeding path 72. The diode 45 is an example of a diode connected in parallel with the switch 44 while its anode is connected to the first feeding path 71 and its cathode is connected to the second feeding path 72. The diode 45 includes the anode connected to the first feeding path 71 and the cathode connected to the second feeding path 72. Thus, electric power storage unit 43 can be fed by the first converter 11 through the diode 45 even if the switch 44 is turned off, since the electric power can be transmitted from the first feeding path 71 to the second feeding path 72.

The second converter 12 steps down the voltage due to electric energy stored in the electric power storage unit 43 to the port voltage Vc2, and thereby supplies the DC electric power to the control circuit 50, whose voltage has been stepped down to the port voltage Vc2. Meanwhile, the first converter 11 can supply the electric power output from the port 11c to (charge) the electric power storage unit 43 through the diode 45 as long as the first converter 11 has been started, even if the switch 44 is turned off. Therefore, for example, the control circuit 50 having been started with the electric power from the electric power receiving unit 40 can cause the voltage due to electric energy of the electric power storage unit 43 charged in advance by the first converter 11 or the second converter 12, to be stepped down by the second converter 12, thereby receiving the electric power whose voltage has been stepped down from the second converter 12.

For example, the switch 44 is a transistor. For example, the switch 44 including the diode 45 may be a N channel MOSFET.

The first converter 11 may have a configuration for stepping down the voltage of the electric power whose voltage is the port voltage Vb supplied from the battery 62b to a voltage Va1 (for example, 48 V) which is greater than the port voltage Vc1, and thereby supply the electric power whose voltage has been stepped down to a second load 61a that is different from the load 61c. The maximum electric power Pmax1 that can be supplied from the first converter 11 to the load 61c or the second load 61a is greater than the maximum electric power Pmax2 that can be supplied from the second converter 12 to the electric power storage unit 43 or the control circuit 50. Thus, the lack of the electric power necessary for the load 61c or the second load 61a is prevented. Also, the second converter 12 can be more miniaturized than the first converter 11.

The second load 61a is one or more loads connected to the port 11a of the first converter 11. An electric power steering system for assisting the steering operation is exemplified as the second load 61a.

Figure 2:
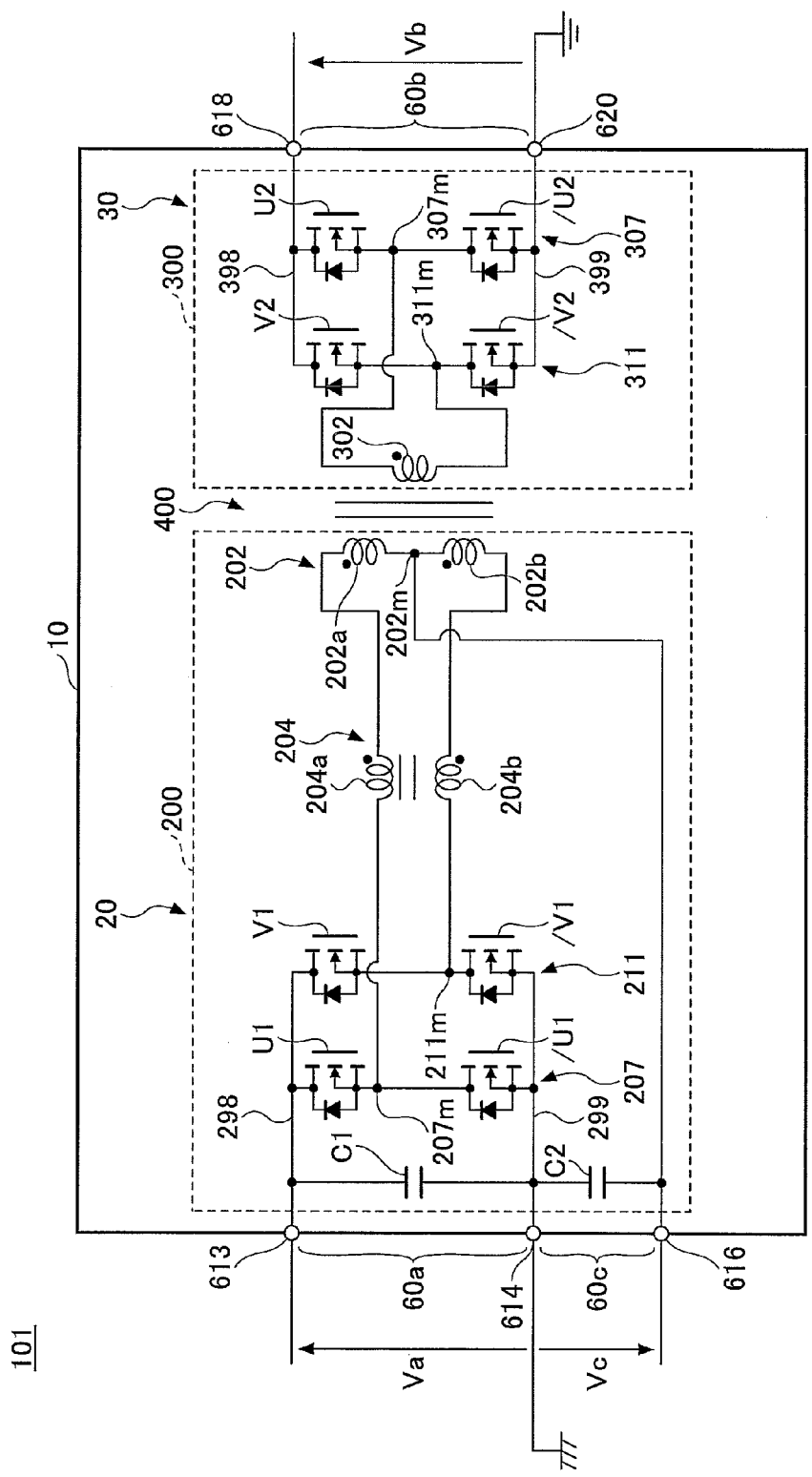
FIG. 2 is a diagram for illustrating an example configuration of DC-DC converter.

FIG. 2 is a diagram for illustrating an example configuration of an electric power source circuit 10. The electric power source circuit 10 is an example of the first converter 11 or the second converter 12. In a case where the electric power source circuit 10 shown in FIG. 2 is the example of the first converter 11 shown in FIG. 1, a first port 60a corresponds to the port 11a, a second port 60c corresponds to the port 11c, a third port 60b corresponds to the port 1ib, the port voltage Va corresponds to the port voltage Va1, and the port voltage Vc corresponds to the port voltage Vc1. Meanwhile, in a case where the electric power source circuit 10 shown in FIG. 2 is the example of the second converter 12 shown in FIG. 1, a first port 60a corresponds to the port 12a, a second port 60c corresponds to the port 12c, a third port 60b corresponds to the port 12b, the port voltage Va corresponds to the port voltage Va2, and the port voltage Vc corresponds to the port voltage Vc2.

The electric power source circuit 10 is an electric power conversion circuit including the aforementioned three ports, whereas the electric power is converted between two ports that are arbitrarily selected from the three ports.

Additionally, the electric power source circuit 10 may be a circuit including three or more ports and capable of converting the electric power between any two ports among the three or more ports.

The port voltage Va, Vc and Vb are respectively input voltages (or output voltages) of the first port 60a, the second port 60c and the third port 60b.

The electric power source circuit 10 may include a capacitor C1 connected to the first port 60a. The electric power source circuit 10 may include a capacitor C2 connected to the second port 60c. A film capacitor, an aluminum electrolytic capacitor, a polymer solid capacitor, etc., are exemplified as the capacitor C1 or C2.

For example, the capacitor C1 is connected between a terminal 613 at a high-potential side of the first port 60a and a terminal 614 at low-potential side of the first port 60a and the second port 60c. For example, the port voltage Va can be smoothed by connecting the capacitor C1 to the first port 60a.

For example, the capacitor C2 is connected between a terminal 616 at high-potential side of the second port 60c and a terminal 614 at low-potential side of the first port 60a and the second port 60c. For example, the port voltage Vc can be smoothed by connecting the capacitor C2 to the second port 60c.

The electric power source circuit 10 is an electric power conversion circuit including a primary conversion circuit 20 and a secondary conversion circuit 30. Additionally, the primary conversion circuit 20 and the secondary conversion circuit 30 are magnetically coupled through a transformer 400. A primary port including the first port 60a and the second port 60c and a secondary port including the third port 60b are connected through the transformer 400.

The transformer 400 includes a primary coil 202 and a secondary coil 302 that are magnetically coupled with a coupling coefficient $k_T$ and serves as a transformer whose turn ratio of the primary coil 202 and the secondary coil 302 is 1:N. "N" is a positive number greater than "1". For example, the transformer 400 is a center tap transformer including a center tap 202m.

The primary coil 202 includes a first primary winding 202a, second primary winding 202b and the center tap 202m extending from an intermediate connection point of the first primary winding 202a and the second primary winding 202b. A winding number of the first secondary winding 202a is equal to that of the second primary winding 202b. The center tap 202m is connected to the terminal 616 at high-potential side of the second port 60c.

The primary conversion circuit 20 is a primary circuit including a primary full bridge circuit 200, the first port 60a and the second port 60c. The primary full bridge circuit 200 is disposed at the primary side of the transformer 400. The primary full bridge circuit 200 is a primary electronic power conversion unit including the primary coil 202 of the transformer 400, a primary magnetic coupling reactor 204, a first primary upper arm U1, a first primary lower arm /U1, a second primary upper arm V1 and a second primary lower arm /V1.

For example, the first primary upper arm U1, the first primary lower arm /U1, the second primary upper arm V1 and the second primary lower arm /V1 are switching elements respectively including an N channel MOSFET and a body diode (parasitic diode) that is a parasitic element of the MOSFET. Additional body diodes may be connected in parallel with the respective arms.

The primary full bridge circuit 200 includes a primary positive electrode bus 298 connected to the terminal 613 at the high-potential side of the first port 60a and a primary negative electrode bus 299 connected to the terminal 614 at the low-potential side of the first port 60a and the second port 60c.

A first primary arm circuit 207 is connected between the primary positive electrode bus 298 and the primary negative electrode bus 299, where the first primary upper arm U1 and the first primary lower arm /U1 are connected in series in the first primary arm circuit 207. The first primary arm circuit 207 is a first primary electric power conversion circuit unit (U-phase primary electric power conversion circuit unit) capable of performing electric power conversion operations by performing switching on/off operations in the first primary upper arm U1 and the first primary lower arm /U1.

A second primary arm circuit 211 is connected between the primary positive electrode bus 298 and the primary negative electrode bus 299, where the second primary upper arm V1 and the second primary lower arm /V1 are connected in series in the second primary arm circuit 211. The second primary arm circuit 211 is connected in parallel with the first primary arm circuit 207. The second primary arm circuit 211 is a second primary electric power conversion circuit unit (V-phase primary electric power conversion circuit unit) capable of performing electric power conversion operations by performing switching on/off operations in the second primary upper arm V1 and the second primary lower arm /V1.

The primary coil 202 and the primary magnetic coupling reactor 204 are disposed at a bridge part for connecting a center point 207m of the first primary arm circuit 207 and a center point 211m of the second primary arm circuit 211. Here, connections in the bridge part are described in detail. One end of a first primary reactor 204a of the primary magnetic coupling reactor 204 is connected to the center point 207m of the first primary arm circuit 207. One end of the primary coil 202 is connected to the other end of the first primary reactor 204a. Also, one end of a second primary reactor 204b of the primary magnetic coupling reactor 204 is connected to the other end of the primary coil 202. Further, the other end of the second primary reactor 204b is connected to the center point 211m of the second primary arm circuit 211.

The primary magnetic coupling reactor 204 includes the first primary reactor 204a and the second primary reactor 204b which is magnetically coupled with the first primary reactor 204a at a coupling coefficient $k_1$.

The center point 207m is a first primary intermediate node between the first primary upper arm U1 and the first primary lower arm /U1, while the center point 211m is a second primary intermediate node between the second primary upper arm V1 and the second primary lower arm /V1. The center point 207m is connected to the center point 211m through the first primary reactor 204a, the primary coil 202, and a second primary reactor 204b in that order.

The first port 60a is an input/output node connected to the primary full bridge circuit 200 and disposed between the primary positive electrode bus 298 and the primary negative electrode bus 299. The first port 60a includes the terminal 613 and the terminal 614.

The second port 60c is an input/output port connected to the center tap 202m at the primary side of the transformer 400, and disposed between the primary negative electrode bus 299 and the center tap 202m of the primary coil 202. The second port 60c includes the terminal 614 and the terminal 616.

The secondary conversion circuit 30 is a secondary circuit including a secondary full bridge circuit 300 and the third port 60b. The secondary full bridge circuit 300 is disposed at the secondary side of the transformer 400. The secondary full bridge circuit 300 is a secondary electric power conversion unit including the secondary coil 302 of the transformer 400, a first secondary upper arm U2, a first secondary lower arm /U2, a second secondary upper arm V2, and a second secondary lower arm /V2.

For example, the first secondary upper arm U2, the first secondary lower arm /U2, the second secondary upper arm V2 and the second secondary lower arm /V2 are switching elements respectively including a N channel MOSFET and a body diode (parasitic diode) that is a parasitic element of the MOSFET. Additional body diodes may be connected in parallel with the respective arms.

The secondary full bridge circuit 300 includes a secondary positive electrode bus 398 connected to the terminal 618 at high-potential side of the third port 60b and a secondary negative electrode bus 399 connected to the terminal 620 at low-potential side of the third port 60b.

A first secondary arm circuit 307 is connected between the secondary positive electrode bus 398 and the secondary negative electrode bus 399, where the first secondary upper arm U2 and the first secondary lower arm /U2 are connected in series in the first secondary arm circuit 307. The first secondary arm circuit 307 is a first secondary electric power conversion circuit unit (U-phase secondary electric power conversion circuit unit) capable of performing electric power conversion operations by performing switching on/off operations in the first secondary upper arm U2 and the first secondary lower arm /U2.

A second secondary arm circuit 311 is connected between the secondary positive electrode bus 398 and the secondary negative electrode bus 399, where the second secondary upper arm V2 and the second secondary lower arm /V2 are connected in series in the second secondary arm circuit 311. The second secondary arm circuit 311 is connected in parallel with the first secondary arm circuit 307. The second secondary arm circuit 311 is a second electric power conversion circuit unit (V-phase secondary electric power conversion circuit unit) capable of performing electric power conversion operation by performing switching on/off operations in the second secondary upper arm V2 and the second secondary lower arm /V2.

The secondary coil 302 is disposed at a bridge part for connecting a center point 307m of the first secondary arm circuit 307 and a center point 311m of the second secondary arm circuit 311. Here, connections in the bridge part are described in detail. One end of the secondary coil 302 is connected to center point 307m of the first secondary arm circuit 307. The other end of the secondary coil 302 is connected to the center point 311m of the second secondary arm circuit 311.

The center point 307m is a first secondary intermediate node between the first secondary upper arm U2 and the first secondary lower arm /U2, while the center point 311m is a second secondary intermediate node between the second secondary upper arm V2 and the second secondary lower arm /V2. The center point 307m is connected to the center point 311m through the secondary coil 302.

The third port 60b is an input/output port connected to the secondary full bridge circuit 300 and disposed between the secondary positive electrode bus 398 and the secondary negative electrode bus 399. The third port 60b includes the terminal 618 and the terminal 620.

The control circuit 50 (see FIG. 1) is an example of a circuit for outputting a control signal (for example, the first control signal or the second control signal) to have the respective arms in the primary full bridge circuit 200 and the secondary full bridge circuit 300 be turned on/off.

Figure 3:
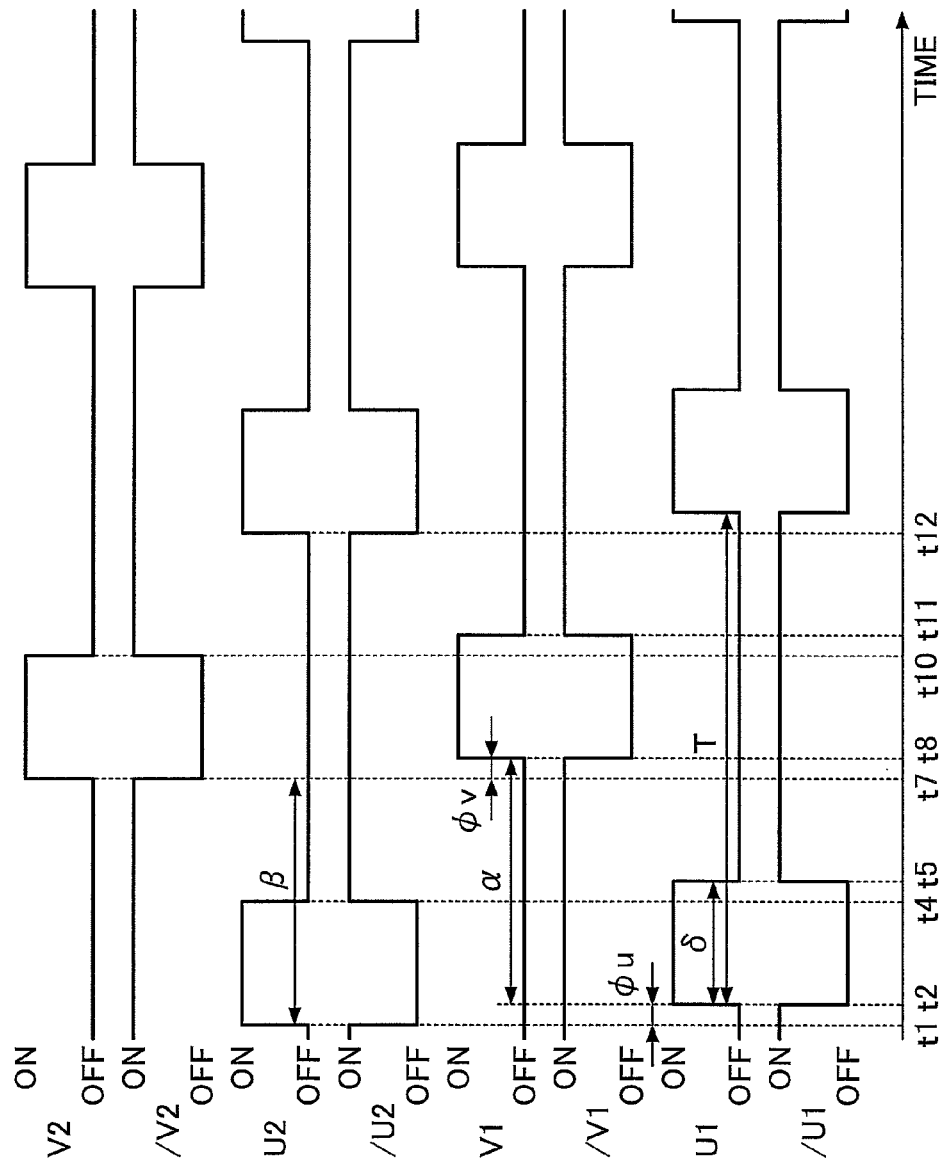
FIG. 3 is a timing diagram for illustrating an example on/off operations DC-DC converter shown in FIG. 2.

FIG. 3 is a timing diagram for illustrating an example on/off operations in the respective arms. In FIG. 3, "U1" shows an on/off waveform in the first primary upper arm U1, "V1" shows an on/off waveform in the second primary upper arm V1, "U2" shows an on/off waveform in the first secondary upper arm U2, and "V2" shows an on/off waveform in the second secondary upper arm V2. On/off waveforms in the first primary lower arm /U1, the second primary lower arm /V1, the first secondary lower arm /U2 and the second secondary lower arm /V2 are respectively inverted waveforms of the on/off waveforms in the first primary upper arm U1, the second primary upper arm V1, the first secondary upper arm U2 and the second secondary upper arm V2.

Additionally, a dead time may be prepared between the respective waveforms in the upper arm and the lower arm so as to prevent flow through current. Also, in the eight waveforms shown in FIG. 3, high level corresponds to a state of "on", while low level corresponds to a state of "off".

The control circuit 50 controls the respective arms to turn on/off by repeating a switching pattern including four periods. In a first period t2-t4, the first upper arms U1 and U2 and the second lower arms /V1 and /V2 are turned on, while the second upper arms V1 and V2 and the first lower arms /U1 and /U2 are turned off. In a second period t5-t7, the first lower arms /U1 and /U2 and the second lower arms /V1 and /V2 are turned on, while the first upper arms U1 and U2 and the second upper arms V1 and V2 are turned off. In a third period t8-t10, the first lower arms /U1 and /U2 and the second upper arms V1 and V2 are turned on, while the first upper arms U1 and U2 and the second lower arms /V1 and /V2 are tuned off. In a fourth period t11-t12, the first lower arms /U1 and /U2 and the second lower arms /V1 and /V2 are turned on, while the first upper arms U1 and U2 and the second upper arms V1 and V2 are turned off.

For example, the control circuit 50 can change a step-up/down ratio (step-up ratio or step-down ratio) of the primary full bridge circuit 200 by controlling a duty ratio D (=δ/T).

The duty ratio D shows a ratio by "on" state time δ to a switching period T of the first primary upper arm U1 and the second primary upper arm V1 in the primary full bridge circuit 200. The duty ratio D in the first primary upper arm U1 is the same as a duty ratio D in the second primary upper arm V1. The step-up/down ratio of the primary full bridge circuit 200 is equal to a transformation ratio between the first port 60a and the second port 60c.

Therefore, for example, the following expression can be formed.

step-up/down ratio of the primary full bridge circuit 200=(voltage at the second port 60c)/(voltage at the first port 60a)=δ/T Additionally, the "on" state time δ indicates the "on" state time in the first primary upper arm U1 and the second primary upper arm V1, as well as the "on" state time in the first secondary upper arm U2 and the second secondary upper arm V2. Also, the switching period T of the arms included in the primary full bridge circuit 200 is the same as the switching period T of the arms included in the secondary full bridge circuit 300.

Also, for example, normally, the control circuit 50 sets the respective waveforms so that U1 and V1 have a phase difference α which is equal to 180 degree (n), and U2 and V2 have a phase difference β which is equal to 180 degree (n). The phase difference α between U1 and V1 is a time difference between a timing t2 and a timing t8, while the phase difference β between U2 and V2 is a time difference between a timing t1 and a timing t7.

Further, the control circuit 50 can adjust electric power P transmitted between the primary full bridge circuit 200 and the secondary full bridge circuit 300 through the transformer 400 by controlling a phase difference φ (phase difference φu and phase difference φv).

The phase difference φ indicates a shift between switching timings (time lag) in the respective electric power conversion circuit units provided for the same phase included in the primary full bridge circuit 200 and the secondary full bridge circuit 300.

The phase difference φu indicates a shift between the switching timings in respective corresponding arms included in the first primary arm circuit 207 and the first secondary arm circuit 307, and a time difference in between the switching operations of the first primary arm circuit 207 and the first secondary arm circuit 307. For example, the phase difference φu indicates a difference between the timing t2 at which the first primary upper arm U1 is turned on and the timing t1 at which the first secondary upper arm U2 is turned on. The respective switching operations in the first primary arm circuit 207 and the first secondary arm circuit 307 are controlled in the same phase (that is, U phase) by the control circuit 50.

The phase difference φv indicates a shift between the switching timings in corresponding phases in the second primary arm circuit 211 and the second secondary arm circuit 311, and a time difference in between the switching operations of the second primary arm circuit 211 and the second secondary arm circuit 311. For example, the phase difference φv indicates a difference between the timing t8 at which the second primary upper arm V1 is turned on and the timing t7 at which the second secondary upper arm V2 is turned on. The respective switching operations in the second primary arm circuit 211 and the second secondary arm circuit 311 are controlled in the same phase (that is, V phase) by the control circuit 50.

The control circuit 50 can transmit the electric power P from the primary full bridge circuit 200 to the secondary full bridge circuit 300 by controlling the phase difference φu to be a positive value and the phase difference φv to be a positive value, and transmit the electric power P from the secondary full bridge circuit 300 to the primary full bridge circuit 200 by controlling the phase difference φu to be a negative value and the phase difference φv to be a negative value. That is, between the electric power conversion circuit units provided for the same phase included in the primary full bridge circuit 200 and the secondary full bridge circuit 300, the electric power P is transmitted from a full bridge circuit whose electric power conversion circuit unit has an upper arm turned on earlier to a full bridge circuit whose electric power conversion circuit unit has an upper arm turned on later.

For example, in FIG. 3, the timing t1 at which the first secondary upper arm U2 is turned on comes earlier than the timing t2 at which the first primary upper arm U1 is turned on. Therefore, the electric power P is transmitted from the secondary full bridge circuit 300 which includes the first secondary arm circuit 307 including the first secondary arm U2 to the primary full bridge circuit 200 which includes the first primary arm circuit 207 including the first primary upper arm U1. Similarly, the timing t7 at which the second secondary upper arm V2 is turned on comes earlier than the timing t8 at which the second primary upper arm V1 is turned on. Therefore, the electric power P is transmitted from the secondary full bridge circuit 300 which includes the second secondary arm circuit 311 including the second secondary arm V2 to the primary full bridge circuit 200 which includes the second primary arm circuit 211 including the second primary upper arm V1.

Normally, the control circuit 50 controls the phase difference φu to be the same as the phase difference φv. However, it may control the phase difference φu and the phase difference φv to be shifted from each other as long as a precision required in transmitting the electric power P is satisfied. That is, although the phase difference φu is normally set to be the same as the phase difference φv, the respective phase differences may be shifted from each other as long as a precision required in transmitting the electric power P is satisfied.

For example, the control circuit 50 can control the duty ratio D by performing an operation in which the port voltage Vc detected by a detecting circuit is fed back so that the port voltage Vc becomes equal to a target voltage Vco set for the second port 60c. Also, the control circuit 50 can control the duty ratio D by performing an operation in which the port voltage Va detected by a detecting circuit is fed back so that the port voltage Va becomes equal to a target voltage Vao set for the first port 60a, at another timing.

Further, for example, the control circuit 50 can control the phase difference φ by performing an operation in which the electric power P to be transmitted detected by a detecting circuit is fed back so that the electric power P becomes equal to a target electric power Po. For example, the control circuit 50 performs an electric power feedback operation in which the electric power $P_{A+C}$ to be transmitted from the third port 60b to the first port 60a and the second port 60c, which is detected by the detecting circuit, is fed back, thereby controlling the phase difference so that the electric power $P_{A+C}$ becomes equal to the target electric power $P_{A+C*}$. Or, at another timing, the control circuit 50 performs an electric power feedback operation in which the electric power $P_B$ to be transmitted from the first port 60a to the third port 60b, which is detected by the detecting circuit, is fed back, thereby controlling the phase difference φ so that the electric power $P_B$ becomes equal to the target electric power $P_{B*}$.

The electric power $P_{A+C}$ is transmitted from the secondary full bridge circuit 300 to the primary full bridge circuit 200 through the transformer 400, and is equal to a sum of the electric power $P_A$ transmitted to the first port 60a and the electric power $P_C$ transmitted to the second port 60c. The electric power $P_A$ is equal to a product of the port voltage Va at the first port 60a and port current Ia output from the first port 60a. The electric power $P_C$ is equal to a product of the port voltage Vc at the second port 60c and port current Ic output from the second port 60c. The electric power $P_B$ is equal to a product of the port voltage Vb at the third port 60b and port current Ib output from the third port 60b.

As described above, the electric power source circuit 10 detects the port voltages Va, Vb and Vc and the port currents Ia, Ib and Ic to control at least one of the duty ratio D and the phase difference φ, thereby performing the electric power conversion between the respective ports.

Figure 4:
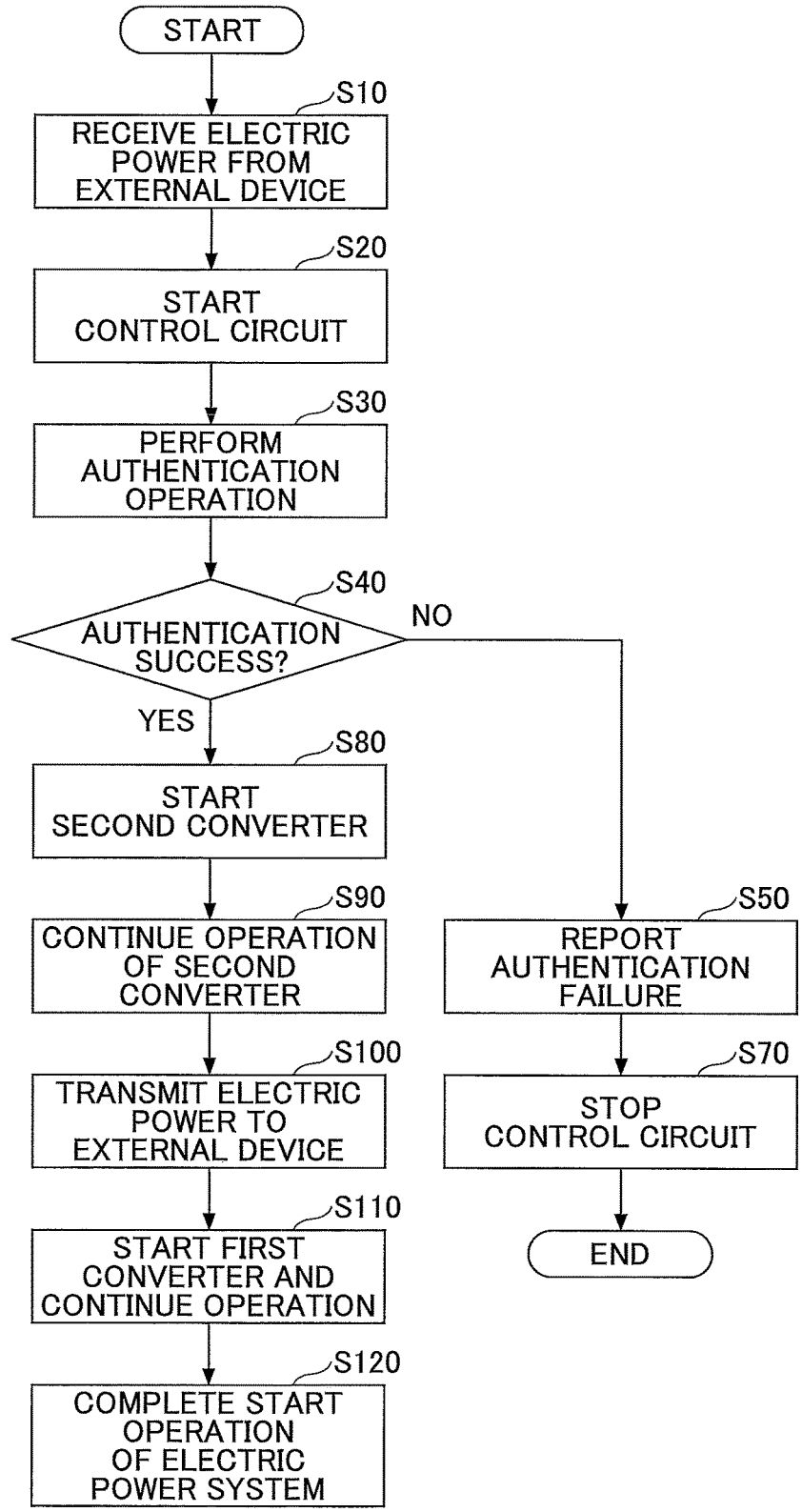
FIG. 4 is a flowchart for illustrating an example operation in starting the electric power system.

FIG. 4 is a flowchart for illustrating an example operation in starting the electric power system 101 shown in FIG. 1.

In step S10, the electric power receiving unit 40 receives low-voltage electric power from the external device 80.

In step S20, the control circuit 50 starts with the electric power received by the electric power receiving unit 40.

In step S30, the external device 80 performs an authentication operation between the external device 80 and the control circuit 50. Although, the control circuit 50 may perform the authentication operation, the electric power supplied from the electric power receiving unit 40 to the control circuit 50 can be saved by performing the authentication operation by the external device 80. A password authentication, a biometrics authentication such as a fingerprint authentication, etc., are exemplified as the aforementioned authentication.

In step S30, in a case where the external device 80 performs the authentication operation, the control circuit 50 having started with the electric power supplied from the electric power receiving unit 40 transmits an identification code set for the control circuit 50 to the external device 80.

In step S40, the external device 80 compares the identification code received from the control circuit 50 with the identification code set for the external device 80, thereby determining whether the authentication is successfully completed.

In step S50, for example, in a case where the authentication results in failure in step S40, the external device 80 reports an authentication failure to the control circuit 50. Also, the external device 80 notifies the user of the authentication failure through a sound output or a screen display in a case where the authentication results in failure in step S40. Thus, the user can be aware of the authentication failure.

In step S70, the electric power supply from the electric power receiving unit 40 to the control circuit 50 is stopped since the external device 80 stops the electric power supply to the electric power receiving unit 40 in a case where the authentication results in failure in step S40. Therefore, the control circuit 50 stops without starting the first converter 11 and the second converter 12.

In step S80, the external device 80 reports the authentication success to the control circuit 50 in a case where the authentication is successfully completed in step S40. In this case, the control circuit 50 starts the second converter 12. By starting the second converter 12, the electric power can start to be supplied from the second converter 12 to the control circuit 50, and the electric power storage unit 43 can be start to be charged. When the electric power starts to be supplied to the control circuit 50, the electric power necessary in starting the control circuit 50 is secured.

In step S90, in a case where the voltage of the electric power storage unit 43 is less than a certain voltage Vth, the control circuit 50 continues to have the second converter 12 perform the electric power conversion operation until the voltage of the electric power storage unit 43 becomes greater than the certain voltage Vth. Thus, the second converter 12 can supply the electric power of the electric power storage unit 43 whose voltage is stepped down to the port voltage Vc2 to the control circuit 50 without receiving the electric power from the battery 62b. Also, the lack of electric power supplied from the electric power storage unit 43 to the load 61c is prevented even when the conduction state between the first feeding path 71 and the second feeding path 72 becomes conductive.

In step S100, the electric power receiving unit 40 transmits the electric power whose voltage is stepped down to the port voltage Vc2 by the second converter 12 to the external device 80. Thus, the electric power receiving unit 40 can return the electric power consumed by the external device 80 to start the control circuit 50 to the external device 80.

In step S110, the control circuit 50 starts the first converter 11 upon the voltage of the electric power storage unit 43 being greater than the certain voltage Vth. That is, the control circuit 50 prevents starting the first converter 11 when the voltage of the electric power storage unit 43 is less than the certain voltage Vth. Thus, the lack of compensation electric power supplied from the electric power storage unit 43 to the load 61c is prevented even when the conduction state between the first feeding path 71 and the second feeding path 72 becomes conductive after the first converter 11 is started. The first converter 11 started by the control circuit 50 starts or continues to supply the electric power to the load 61c and the second load 61a.

The load 61c may include an unlock device for unlocking the door 47 of the vehicle in a case where the authentication is successfully completed in step S40. By supplying the electric power from the first converter 11 to the unlock device, the unlock device can unlock the door 47. Therefore, in a case where the electric power receiving unit 40 is disposed in the door 47, a proper user outside the vehicle can unlock the door 47 by hanging the external device 80 over the electric power receiving unit 40.

In step S120, the start operation of the electric power system 101 is completed since the start operations of the control circuit 50, the first converter 11 and the second converter 12 are completed.

Figure 5:
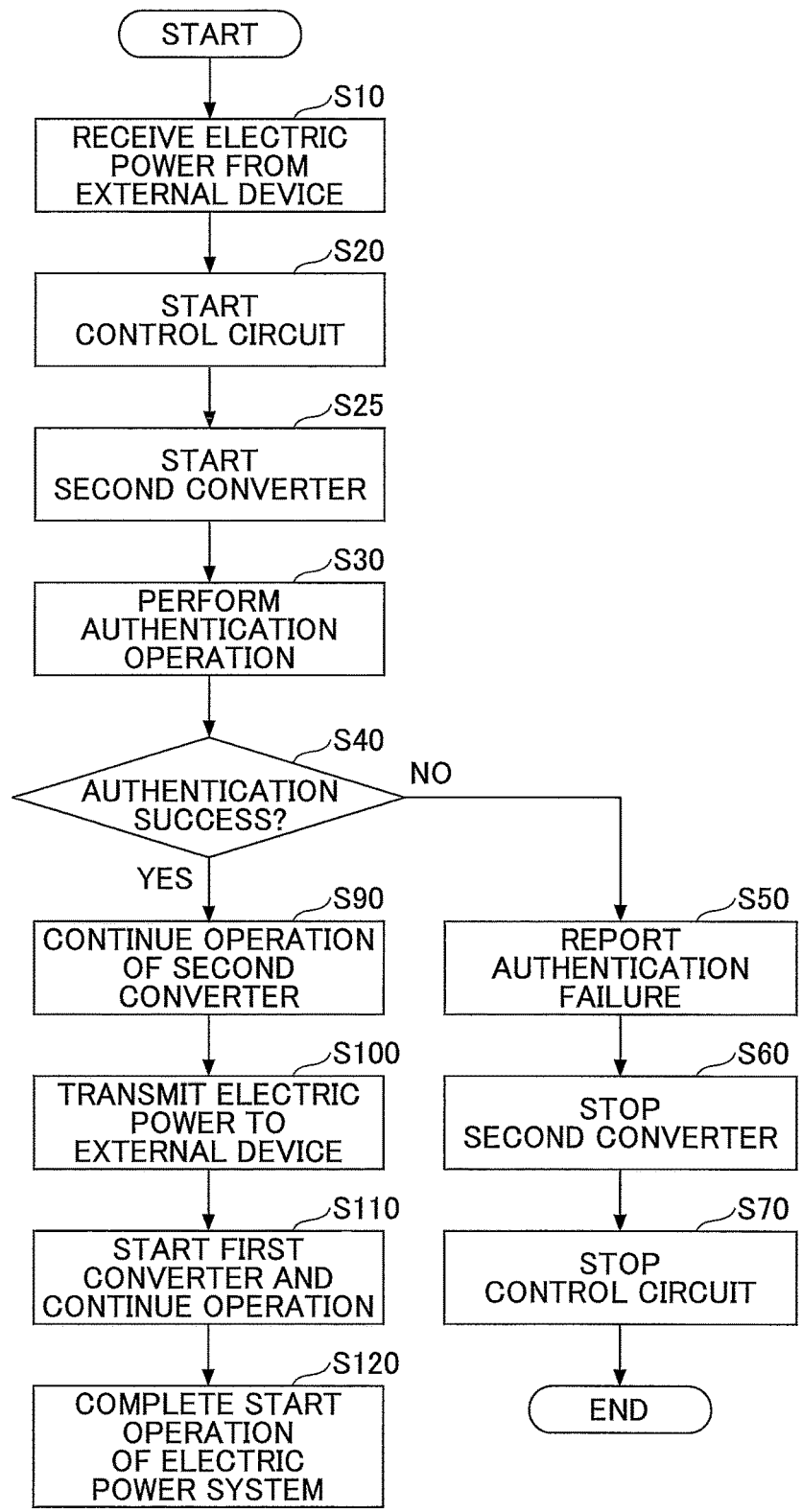
FIG. 5 is a flowchart for illustrating another example operation in starting the electric power system.

FIG. 5 is a flowchart for illustrating another example operation in starting the electric power system 101. Descriptions on the steps similar to those shown in FIG. 4 are omitted.

In step S25, the control circuit 50 has the second converter 12 start before the authentication operation is performed in step S30. Thus, the electric power supplied from the second converter 12 to the control circuit 50 can be secured without waiting for the authentication result.

In step S60, the control circuit 50 stops the second converter 12 in a case where the authentication failure is reported in step S50. In step S70, the control circuit 50 is stopped since the electric power supply to the control circuit 50 is stopped when the second converter 12 is stopped.

Figure 6:
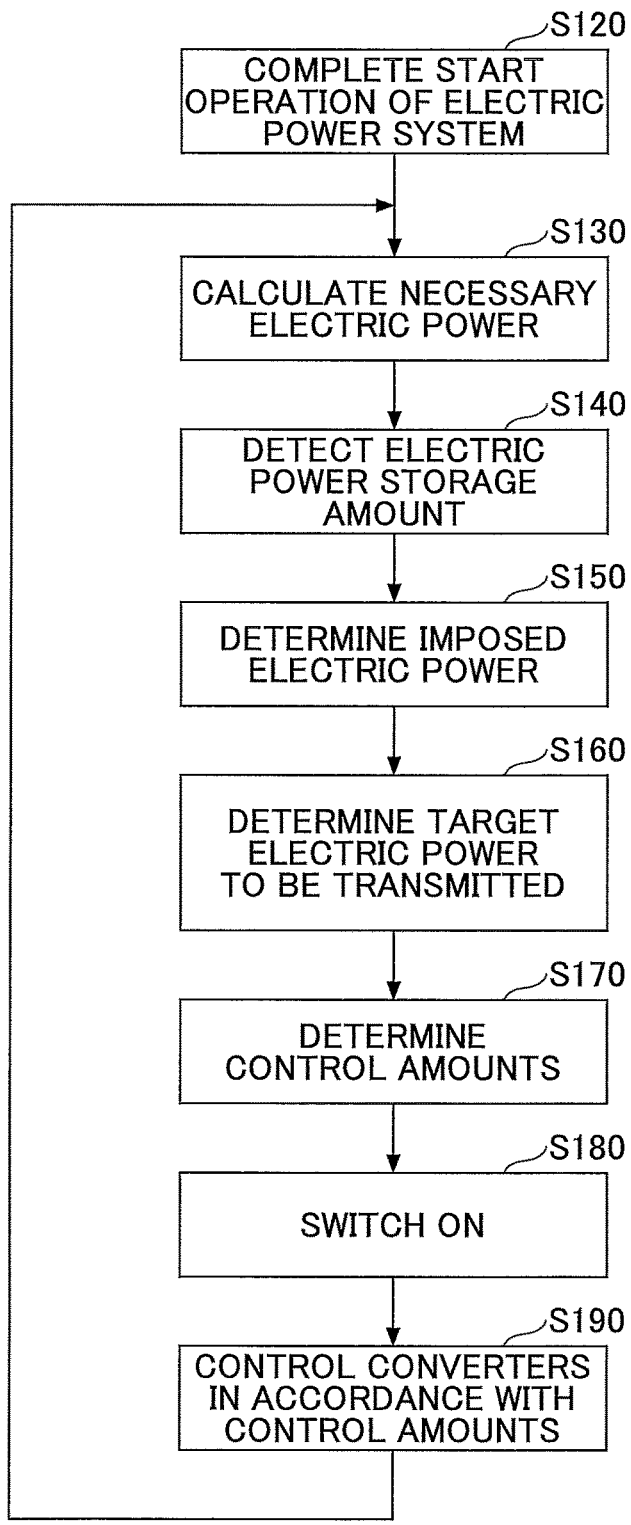
FIG. 6 is a flowchart for illustrating an example operation after starting the electric power system.

FIG. 6 is a flowchart for illustrating an example operation after starting the electric power system 101. In FIG. 6, an operation performed after completing the process of step S120 shown in FIG. 4 or FIG. 5 is shown. The control circuit 50 changes a ratio of respective electric power levels (rate) of the electric power supplied from the first converter 11 to the load 61c and the second load 61a, the electric power levels supplied from the second converter 12 to the electric power storage unit 43 and the control circuit 50, and the electric power levels supplied from the electric power storage unit 43 to the load 61c. Thus, the first converter 11 and the second converter 12 can be operated at an efficient operational point (level). An example method for changing the ratio is described in the following.

In step S130, the control circuit 50 calculates a total amount of electric power (necessary electric power Pn) necessary for operating the second load 61a, the load 61c and the control circuit 50.

In step S140, the control circuit 50 detects an electric power storage amount (remaining electric power rate or remaining energy) of the electric power storage unit 43.

In step S150, the control circuit 50 determines an amount of the electric power (imposed electric power Ps) to be imposed on the electric power storage unit 43 among the necessary electric power Pn calculated in step S130. For example, the control circuit 50 determines the imposed electric power Ps which is less than the electric power storage amount detected in step S140, according to a predetermined table in order to prevent an over discharge of the electric power storage circuit 43.

In step S160, the control circuit 50 determines a target electric power P11 to be transmitted by the first converter 11 and a target electric power P12 to be transmitted by the second converter 12 necessary for generating a remaining electric power Pr calculated by subtracting the imposed electric power Ps from the necessary electric power Pn (Pr=P11+P12). For example, the control circuit 50 determines the target electric power P11 and the target electric power P12 based on an efficiency η11 of the first converter 11 and an efficiency η12 of the second converter 12 so that a total efficiency integrating the efficiency η11 and the efficiency η12 becomes the greatest.

Figure 7:
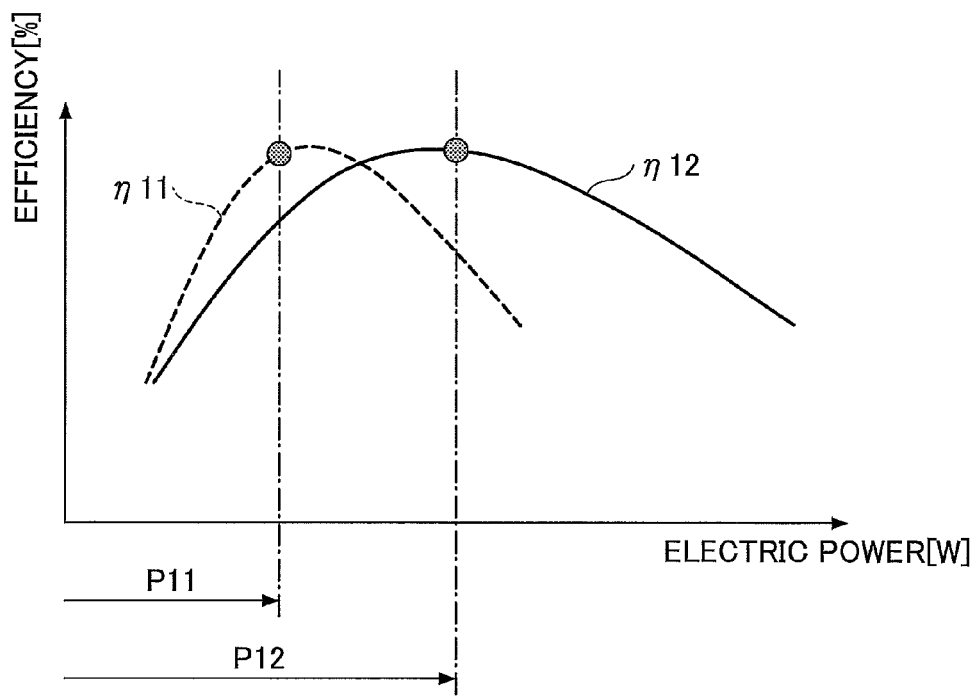
FIG. 7 is a diagram for illustrating a characteristic of efficiency of the DC-DC converter shown in FIG. 2

FIG. 7 is a diagram for illustrating a characteristic of efficiency η of the electric power source circuit 10 shown in FIG. 2. The control circuit 50 determines, based on the characteristic shown in FIG. 7, the target electric power P11 with which the efficiency η11 of the first converter 11 can be improved as much as possible and the target electric power P12 with which the efficiency η12 of the second converter 12 can be improved as much as possible so that the sum of the target electric power P11 and the target electric power P12 becomes equal to the remaining electric power Pr.

In step S170 shown in FIG. 6, the control circuit 50 determines a first control amount (for example, the phase difference φ11 of the first converter 11) necessary for generating the target electric power P11 and a second control amount (for example, the phase difference φ12 of the second converter 12) necessary for generating the target electric power P12.

In step S180, the control circuit 50 turns the switch 44 of the switching circuit 46 to be on. Thus, the imposed electric power Ps imposed on the electric power storage unit 43 can be supplied to the load 61c.

In step S190, the control circuit 50 controls the power conversion operations of the first converter 11 and the second converter 12 in accordance with the control amounts determined in step S170. Thus, the control circuit 50 can control the first converter 11 and the second converter 12 so that the sum of the imposed electric power Ps, the electric power transmitted by the first converter 11 and the electric power transmitted by the second converter 12 becomes equal to the necessary electric power Pn. Also, the first converter 11 and the second converter 12 can be operated at the operational point, where the total efficiency integrating the efficiency η11 and the efficiency η12 becomes high.

Herein above, although the invention has been described with respect to a specific embodiment, the appended claims are not to be thus limited. It should be understood that the various changes, substitutions, and alterations could be made hereto without departing from the spirit and scope of the claims. Further, all or part of the components of the embodiments described above can be combined.

For example, the maximum electric power Pmax1 that can be supplied from the first converter 11 to the load 61c or the second load 61a may be the same as the maximum electric power Pmax2 that can be supplied from the second converter 12 to the electric power storage unit 43 or the control circuit 50.

Also, the respective arms are not limited to the MOSFET, but they may be other semiconductor switching elements capable of performing on/off operations. For example, the respective arms may be voltage control type power elements with insulated gates such as IGBT or MOSFET, or may be bipolar transistors.

Also, in the above descriptions, the primary side and the secondary side may be switched with each other.

The present application is based on Japanese Priority Application No. 2014-242152, filed on Nov. 28, 2014, the entire contents of which are hereby incorporated by reference.

What is claimed is:

1. A vehicle electric power system comprising:
a battery;
a first DC-DC converter configured to step down a voltage of electric power supplied from the battery to supply a load with the converted electric power whose voltage is stepped down;
a second DC-DC converter configured to step down the voltage of the electric power supplied from the battery;
an electric power storage unit configured to accumulate energy of the electric power whose voltage is stepped down to a first voltage by the second DC-DC converter;
an electric power receiving unit configured to receive electric power from an external device, a voltage of the received electric power being less than the first voltage;
a control circuit configured to control the first DC-DC converter and the second DC-DC converter;
a first feeding path between the first DC-DC converter and the load;
a second feeding path between the second DC-DC converter and the electric power storage unit; and
a switching circuit configured to switch conductivity between the first feeding path and the second feeding path; wherein
the control circuit is started with the electric power received by the electric power receiving unit and then controls the second DC-DC converter to step down the voltage of the electric power to the second voltage which is less than the first voltage such that the control circuit is operated with electric power from the second DC-DC converter.

2. The vehicle electric power system as claimed in claim 1, wherein the control circuit controls the second DC-DC converter to power the control circuit in priority to controlling the first DC-DC converter to power the load.

3. The vehicle electric power system as claimed in claim 2, wherein the control circuit starts the first DC-DC converter to power the load after starting the second DC-DC converter to power the control circuit.

4. The vehicle electric power system as claimed in claim 1, wherein the control circuit controls the second DC-DC converter to power the control circuit in priority to controlling the second DC-DC converter to charge the electric power storage unit.

5. The vehicle electric power system as claimed in claim 4, wherein the control circuit controls the second DC-DC converter to charge the electric power storage unit after starting the second DC-DC converter to power the control circuit.

6. The vehicle electric power system as claimed in claim 1, wherein the control circuit starts the first DC-DC converter to power the load upon an authentication between the external device and the control circuit being successfully completed.

7. The vehicle electric power system as claimed in claim 6, wherein the load includes a device which unlocks a door of a vehicle of the vehicle electric power system upon the authentication being successfully completed.

8. The vehicle electric power system as claimed in claim 1, wherein the control circuit stops the second DC-DC converter upon an authentication between the external device and the control circuit resulting in failure.

9. The vehicle electric power system as claimed in claim 1, wherein the electric power whose voltage has been stepped down to the second voltage by the second DC-DC converter is transmitted to the external device after the control circuit is started.

10. The vehicle electric power system as claimed in claim 1, wherein the control circuit controls the switching circuit to have a conduction state between the first feeding path and the second feeding path be conductive in response to detecting a lack of the electric power supplied from the first DC-DC converter to the load.

11. The vehicle electric power system as claimed in claim 10, wherein the control circuit prevents the first DC-DC converter from being started in response to detecting that a voltage of the electric power storage unit is less than a predetermined value.

12. The vehicle electric power system as claimed in claim 1, wherein the switching circuit includes:
a switch configured to turn on/off the conductivity between the first feeding path and the second feeding path; and
a diode connected in parallel with the switch, whose anode is connected to the first feeding path and whose cathode is connected to the second feeding path.

13. The vehicle electric power system as claimed in claim 1, wherein the first DC-DC converter steps down the voltage of the electric power supplied from the battery to a third voltage to power a second load, the third voltage being greater than the first voltage, and
a maximum electric power that can be supplied from the first DC-DC converter to the load and the second load is greater than a maximum electric power that can be supplied from the second DC-DC converter to the electric power storage unit and the control circuit.

14. The vehicle electric power system as claimed in claim 13, wherein the control circuit changes a ratio of respective electric power rates of the electric power supplied from the first DC-DC converter to the load and the second load, the electric power supplied from the second DC-DC converter to the electric power storage unit and the control circuit, and the electric power supplied from the electric power storage unit to the load.

* * * * *